(12) United States Patent
Kim et al.

(10) Patent No.: US 10,654,373 B2
(45) Date of Patent: May 19, 2020

(54) CHARGING APPARATUS FOR ELECTRIC VEHICLE

(71) Applicants: Hyundai Motor Company, Seoul (KR); Kia Motors Corporation, Seoul (KR)

(72) Inventors: Jongpil Kim, Gyeonggi-do (KR); Inyong Yeo, Gyeonggi-do (KR); Youngjin Kim, Incheon (KR); Woo Young Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 3 days.

(21) Appl. No.: 16/168,530

(22) Filed: Oct. 23, 2018

(65) Prior Publication Data

US 2019/0299793 A1    Oct. 3, 2019

(30) Foreign Application Priority Data

Apr. 3, 2018   (KR) ........................ 10-2018-0038498

(51) Int. Cl.
| | |
|---|---|
| *H02M 1/42* | (2007.01) |
| *H02J 7/02* | (2016.01) |
| *H02M 7/219* | (2006.01) |
| *B60L 53/22* | (2019.01) |
| *H02M 1/44* | (2007.01) |

(52) U.S. Cl.
CPC .............. *B60L 53/22* (2019.02); *H02J 7/022* (2013.01); *H02M 1/4233* (2013.01); *H02M 7/219* (2013.01); *B60L 2210/12* (2013.01); *H02M 1/44* (2013.01)

(58) Field of Classification Search
CPC ............ B60L 11/1812; B60L 2210/12; H02M 1/4233; H02M 1/44; H02M 7/219; H02J 7/022
USPC ......................................................... 320/109
See application file for complete search history.

(56) References Cited

U.S. PATENT DOCUMENTS

| | | | |
|---|---|---|---|
| 9,493,080 B2 | 11/2016 | Kvieska et al. | |
| 2010/0080022 A1 | 4/2010 | Schmidt | |
| 2019/0291585 A1* | 9/2019 | Yang et al. | ............. H02P 27/06 |
| 2019/0291586 A1* | 9/2019 | Kim et al. | ............. H02M 1/44 |
| 2019/0299792 A1* | 10/2019 | Kim et al. | ............. H02M 1/36 |
| 2019/0299793 A1* | 10/2019 | Kim et al. | ............. H02J 7/022 |

* cited by examiner

*Primary Examiner* — Sun J Lin
(74) *Attorney, Agent, or Firm* — Mintz Levin Cohn Ferris Glovsky and Popeo, P.C.; Peter F. Corless

(57) ABSTRACT

Disclosed herein is a charging apparatus. The charging apparatus includes an alternating current (AC) power input stage receiving at least one AC input power from among a single-phase AC power and a multi-phase AC power. A power factor corrector has a single three-leg half bridge circuit receiving the at least one AC input power through the AC power input stage. A link capacitor is charged through the power factor corrector. A converter connects between the link capacitor and a battery. A first switch connects any one of an AC power input line and a neutral line of the AC power input stage to the power factor corrector. A second switch selectively connects the AC power input stage to the power factor corrector, or the link capacitor. A controller operates the power factor corrector and the switch network based on a received condition of the at least one AC input power.

17 Claims, 10 Drawing Sheets

BI-PHASE
SYMMETRIC
POWER SOURCE

SINGLE-PHASE
ASYMMETRIC
POWER SOURCE

THREE-PHASE
SYMMETRIC
POWER SOURCE

CHARGING APPARATUS FOR ELECTRIC VEHICLE

CROSS-REFERENCE TO RELATED APPLICATION

This application is based on and claims priority under 35 U.S.C. § 119 to Korean Patent Application No. 10-2018-0038498, filed on Apr. 3, 2018, the disclosure of which is incorporated by reference in its entirety.

BACKGROUND

1. Field of the Disclosure

The present disclosure relates to a vehicle, and more particularly, to a charging apparatus for an electric vehicle configured to travel only using the power of a motor.

2. Description of the Related Art

Unlike an internal combustion vehicle designed to acquire primary energy by burning fossil fuels, an electric vehicle is designed to use electric energy as a primary energy source. Therefore, it is necessary for the electric vehicle to include a high-voltage battery to store electric energy therein, a motor used as a power source, and an inverter to drive the motor.

A charger for charging the battery of the electric vehicle may be classified into a slow-speed charger and a high-speed charger. The slow-speed charger may transmit commercial alternating current (AC) power to a vehicle without being converted. The high-speed charger may convert commercial AC power into direct current (DC) power, and may transmit the DC power to the vehicle. The slow-speed charger has a simplified structure and a low price, and thus is capable of being developed more easily. However, to use the slow-speed charger, an on board charger (OBC) is required to be mounted within the electric vehicle.

The type of AC power provided through the slow-speed charger varies according to the country where the slow-speed chargers are installed. To charge a battery of the electric vehicle using various types of AC power, the on board charger (OBC) should be responsive to various types of AC power. As the capacity of the battery of the electric vehicle increases, the traveling distance of the electric vehicle provided with the battery on a single charge increases. Therefore, many developers and vehicle manufacturers are conducting research into technology for increasing the battery capacity of the electric vehicle. A large-capacity battery embedded within the electric vehicle unavoidably incurs an increase of the total charging time of the electric vehicle. To reduce the charging time of the large-capacity battery, the OBC capacity should be increased. However, increasing the OBC capacity may unavoidably increase the size of constituent elements of the electric vehicle and production costs of the electric vehicle.

SUMMARY

Therefore, the present disclosure provides a charging apparatus for an electric vehicle, which has a reduced-sized and simplified structure, and charges a battery of the electric vehicle upon receiving power from various types of power sources. Additional aspects of the present disclosure will be set forth in part in the description which follows and, in part, will be obvious from the description, or may be learned by practice of the present disclosure.

In accordance with an aspect of the present disclosure, a charging apparatus for an electric vehicle may include: an alternating current (AC) power input stage configured to receive at least one AC input power from among single-phase AC power and multi-phase AC power; a power factor corrector having a single three-leg half bridge circuit configured to receive the AC input power through the AC power input stage; a link capacitor to be charged using the power factor corrector; a converter configured to connect between the link capacitor and a battery; a switch network having a first switch for connecting any one of an AC power input line and a neutral line of the AC power input stage to the power factor corrector, and least one second switch S2, S3, S4, S5, S6, or S7 for selectively connecting the AC power input stage to the power factor corrector, or the link capacitor; and a controller configured to operate the power factor corrector and the switch network based on the condition of the AC input power received through the AC power input stage.

The first switch may be provided to the AC power input stage, and may be turned on or off to respond to a multi-phase condition or a single-phase condition of the AC input power. The at least one second switch may further include a third switch disposed between the AC power input stage and the power factor corrector. The switch network may further include a fourth switch disposed between the power factor corrector and the link capacitor. The switch network may further include a fifth switch and a sixth switch respectively disposed between both ends of the link capacitor and between both ends of the converter.

The converter may further include two switching elements connected in series, a connection point of the two switching elements connected to at least one leg of the power factor corrector, and a seventh switch disposed between the connection point and one end of the battery. The controller may be configured to convert the power factor corrector into a plurality of different types of converters by operating the power factor corrector, the switch network, and an inverter, and may be configured to respond to the condition of the AC input power. The condition of the AC input power may include a multi-phase condition and a single-phase condition of the AC input power. The condition of the AC input power may include a symmetric power condition and an asymmetric power condition of the AC input power.

In accordance with another aspect of the present disclosure, a charging apparatus for an electric vehicle may include: an alternating current (AC) power input stage configured to receive at least one AC input power from among single-phase AC power and multi-phase AC power; a power factor corrector having a single three-leg half bridge circuit configured to receive the AC input power through the AC power input stage; a link capacitor to be charged using the power factor corrector; a converter configured to connect between the link capacitor and a battery; a switch network having a first switch for connecting any one of an AC power input line and a neutral line of the AC power input stage to the power factor corrector, and at least one second switch for selectively connecting the AC power input stage to the power factor corrector, or the link capacitor; and a controller configured to operate the power factor corrector and the switch network based on the condition of the AC input power received through the AC power input stage. The switch network may further include the first switch provided to the AC power input stage, and may be turned on or off to respond to a multi-phase condition or a single-phase condition of the AC input power; and the second switch disposed between the AC power input stage and the power factor corrector.

The switch network may further include a fourth switch disposed between the power factor corrector and the link capacitor. The switch network may further include a fifth switch and a sixth switch respectively disposed between both ends of the link capacitor and between both ends of the converter. The converter may further include two switching elements connected in series, a connection point of the two switching elements connected to at least one leg of the power factor corrector, and a seventh switch disposed between the connection point and one end of the battery.

The controller may be configured to convert the power factor corrector into a plurality of different types of converters by operating the power factor corrector, the switch network, and an inverter, and may be configured to respond to the condition of the AC input power. The condition of the AC input power may include a multi-phase condition and a single-phase condition of the AC input power. The condition of the AC input power may include a symmetric power condition and an asymmetric power condition of the AC input power.

In accordance with another aspect of the present disclosure, a charging apparatus for an electric vehicle may include: an alternating current (AC) power input stage configured to receive at least one AC input power from among single-phase AC power and multi-phase AC power; a power factor corrector having a single three-leg half bridge circuit configured to receive the AC input power through the AC power input stage; a link capacitor to be charged using the power factor corrector; a converter configured to connect between the link capacitor and a battery, and including two switching elements connected in series, a connection point of the two switching elements connected to at least one leg of the power factor corrector, and a seventh switch disposed between the connection point and one end of the battery; a switch network having a first switch for connecting any one of an AC power input line and a neutral line of the AC power input stage to the power factor corrector, and at least one second switch for selectively connecting the AC power input stage to the power factor corrector, or the link capacitor; and a controller configured to operate the power factor corrector and the switch network according to the condition of the AC input power received through the AC power input stage.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
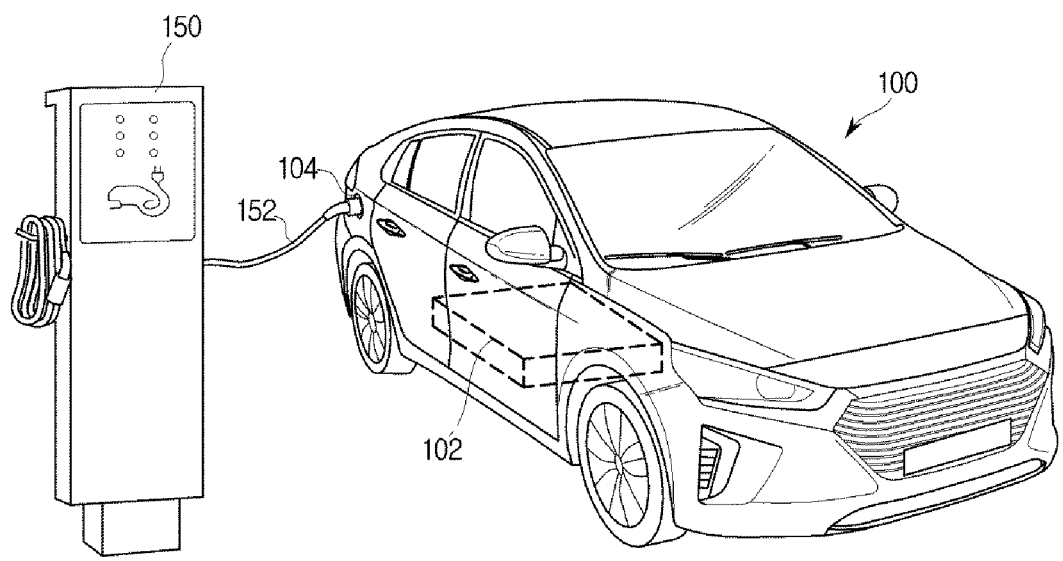
FIG. 1 is a view illustrating the appearance of an electric vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings, wherein like reference numerals refer to like elements throughout.

FIG. 1 is a view illustrating the appearance of an electric vehicle according to an exemplary embodiment of the present disclosure. Referring to FIG. 1, an electric vehicle 100 may include a motor 212 (in FIG. 2). Therefore, the electric vehicle 100 may further include a high-voltage battery 102 configured to store power to be used for driving the motor 212. An auxiliary battery 208 (in FIG. 2) may also be disposed in one side of an engine room in a general internal combustion vehicle. However, a large high-capacity high-voltage battery 102 is required for the electric vehicle 100 whereas the auxiliary battery 208 (in FIG. 2) is disposed at one side of an engine compartment of the general internal combustion vehicle. In the electric vehicle 100 according to the exemplary embodiment, the high-voltage battery 102 may be installed at a lower space of a rear passenger seat. Power stored in the high-voltage battery 102 may be used to generate power by driving the motor 212 (in FIG. 2). The high-voltage battery 102 according to the exemplary embodiment may be a lithium battery.

The electric vehicle 100 may include a charging socket 104. A charging connector 152 of an external slow-speed charger 150 may be connected to the charging socket 104 to charge the high-voltage battery 102 with electricity or power. In other words, when the charging connector 152 of the slow-speed charger 150 is connected to the charging socket 104 of the electric vehicle 100, the high-voltage battery 102 of the electric vehicle 100 may be charged with electricity or power.

Figure 2:
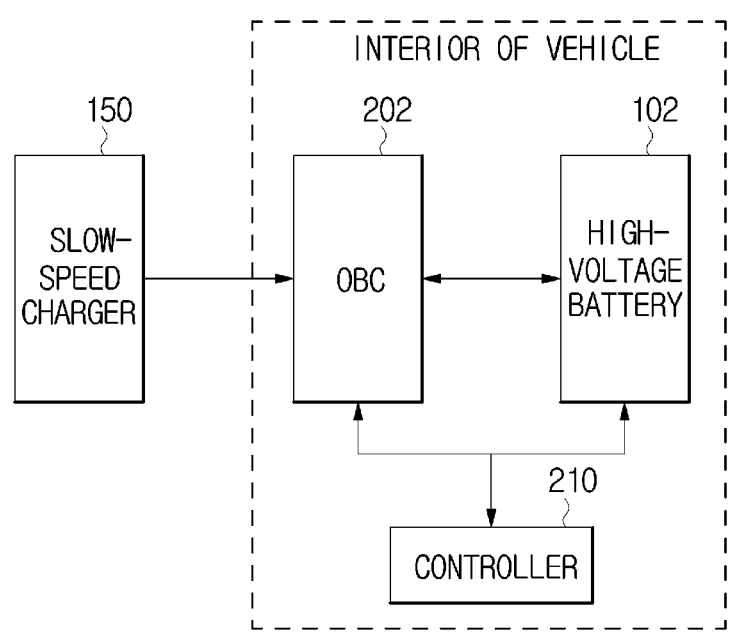
FIG. 2 is a block diagram illustrating an on board charger (OBC) for an electric vehicle according to an exemplary embodiment of the present disclosure.

FIG. 2 is a block diagram illustrating an on board charger (OBC) for an electric vehicle according to an exemplary embodiment of the present disclosure. Referring to FIG. 2, the slow-speed charger 150 may be used to charge the high-voltage battery 102. The high-voltage battery 102 may have a charging voltage of about 400V-800V. The slow-speed charger 150 may be configured to supply AC power to the electric vehicle 100 without being converted. The AC power supplied through the slow-speed charger 150 may be converted into a predetermined DC voltage by the electric vehicle 100.

An on board charger (OBC) 202 mounted within the electric vehicle 100 may be used to charge the high-voltage battery 102. In particular, the OBC 202 may be configured to convert AC power supplied from the slow-speed charger 150 into a DC voltage of about 800V, and may be configured to charge the high-voltage battery 102 with the DC voltage of about 800V. The slow-speed charger 150 may be configured to supply AC power to the electric vehicle 100 without being converted. The AC voltage supplied through the slow-speed charger 150 may be converted into a DC voltage by the OBC 202, and may be used to charge the high-voltage battery 102.

Referring again to FIG. 2, an inverter 206 may be configured to convert the power of the high-voltage battery 102 to have the electrical characteristics required by the motor 212, and transfer the power to the motor 212. The motor 212 may be configured to generate power by rotation using the power transmitted through the inverter 206. In the charging apparatus shown in FIG. 2, the motor 212 and the inverter 206 may be used for charging the high-voltage battery 102 together with the OBC 202 as needed. A controller 210 may be configured to operate the OBC 202, the inverter 206, and the motor 212 to charge the high-voltage battery 102.

Figure 3:
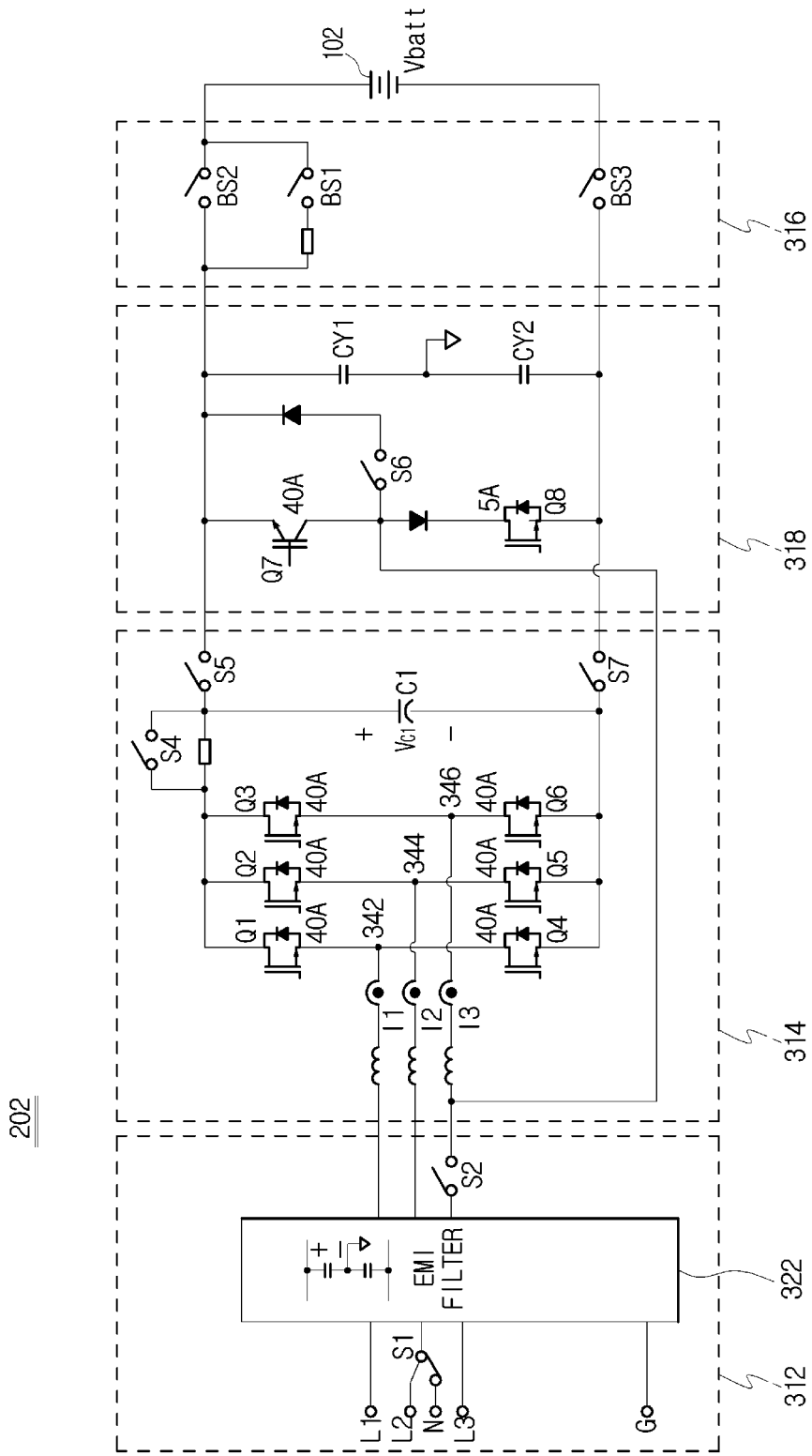
FIG. 3 is a view illustrating a configuration of the OBC according to an exemplary embodiment of the present disclosure.

FIG. 3 is a circuit diagram illustrating the on board charger (OBC) according to an exemplary embodiment of the present disclosure. Referring to FIG. 3, the OBC 202 may include an inputter 312, a boost power factor corrector 314, and a power relay assembly 316.

Particularly, the inputter 312 may be configured to receive AC power from an external AC power source. The inputter 312 may include 5 input lines L1, L2, L3, N, and G, an electromagnetic interference (EMI) filter 322, and a switch S1. The EMI filter 322 may remove noise included in the received AC power. The EMI filter 322 may be connected to the five input lines L1, L2, L3, N, and G. Additionally, AC power may be input from an external AC power source to the EMI filter 322 through the input lines L1, L2, L3, N, and G. In particular, the input lines L1, L2, and L3 may be AC power input lines, N is a neutral line, and G is a ground line.

Up to three-phase AC power may be input to the EMI filter 322 through the AC power input lines L1, L2 and L3 from among the five input lines L1, L2, L3, N, and G. In other words, the three-phase AC power may be input to the EMI filter 322 through all the AC power input lines L1, L2, and L3. Alternatively, bi-phase AC power may be input to the EMI filter 322 through the AC power input lines L1 and L2, or single-phase AC power may be input to the EMI filter 322 through the AC power input line L1 and the neutral line N.

The switch S1 of the inputter 312 may connect any one of the AC power input line L2 and the neutral line N to the EMI filter 322. If the input AC power is three-phase AC power or bi-phase AC power, the switch S1 may be operated to connect the AC power input line L2 to the EMI filter 322. If the input AC power is single-phase AC power, the switch S1 may be operated to connect the neutral line N to the EMI filter 322.

The boost power factor corrector 314 may include a 3-leg half bridge circuit composed of switching elements Q1, Q2, Q3, Q4, Q5, and Q6. A first leg 342 disposed between the switching elements Q1 and Q4, a second leg 344 disposed between the switching elements Q2 and Q5, and a third leg 346 disposed between the switching elements Q3 and Q6 may be connected to the EMI filter 322. The first leg 342 may be configured to detect a phase current I1 transmitted from the EMI filter 322 to the half bridge circuit of the boost power factor corrector 314. The second leg 344 may be configured to detect a phase current I2 transmitted from the EMI filter 322 to the half bridge circuit of the boost power factor corrector 314. The third leg 346 may be configured to detect a phase current I3 transmitted from the EMI filter 322 to the half bridge circuit of the boost power factor corrector 314. Each of the first to third legs 342, 344, and 346 may include an inductor component.

A switch S2 may be disposed between an output terminal of the EMI filter 322 and the third leg 346 disposed between the switching elements Q3 and Q6 from among the three legs 342, 344, and 346. The switch S2 may be operated to be electrically connected between the third leg 346 of the 3-leg half bridge circuit and the output terminal of the EMI filter 322. The third leg 346 of the 3-leg half bridge circuit may also be electrically connected between a switching element Q7 of a converter 318 and a switching element Q8 of the converter 318. A switch S6 may be connected between the switching element Q7 and the switching element Q8 and one end of a capacitor CY1. The boost power factor corrector 314 may include a capacitor C1 which is a power factor corrector (PFC) link capacitor. The capacitor C1 may be disposed between the ends of the half bridge circuit.

Switches S4, S5, and S7 may be further included in the boost power factor corrector 314. The switch S4 may be disposed between an upper end of the half bridge circuit and a positive (+) electrode of the capacitor C1, and may also be connected in parallel to a power factor correction element P1. The remaining two switches S5 and S7 may be respectively disposed at the ends of the capacitor C1, and may electrically connect the boost power factor corrector 314 and the converter 318 to be described later. In other words, the boost power factor corrector 314 may be electrically connected to the converter 318 through the switches S5 and S7. The boost power factor corrector 314 may also be electrically connected to the ends of the power relay assembly 316 via the switches S4 and S5. Capacitors CY1 and CY2, each of which operates as an equivalent modeling capacitor Y, may be connected in series to the converter 318. A node through which the capacitors CY1 and CY2 are interconnected may be grounded.

In the power relay assembly 316, two switches BS1 and BS2 and a single power factor element P2 may be disposed between the capacitor CY1 and the positive (+) electrode of the high-voltage battery 102. The switch BS1 and the power factor element P1 may be connected in series between the capacitor CY1 and the positive (+) electrode of the high-voltage battery 102, and the switch BS2 may be connected in parallel to this serial connection structure. The switch BS3 may be disposed between the capacitor CY2 and a negative (−) electrode of the high-voltage battery 102.

The plurality of switches S1, S2, S4, S5, S6, S7, BS1, BS2, and BS3 included in the switch network of the OBC 202 may be operated by the controller 210 shown in FIG. 2, and may be turned on or off. According to the PFC link capacitor embodiment of the present disclosure, the high-voltage battery 102 may be charged with various types of AC power through various on/off combinations of the plurality of switches S1, S2, S4, S5, S6, S7, BS1, BS2, and BS3 included in the switch network. Various types of AC power may hereinafter be described with reference to FIGS. 4A-4C. Turn-on operation and turn-off operation of the switches S1, S2, S4, S5, S6, S7, BS1, BS2, and BS3 shown in FIG. 3 may be executed by the controller 210, and turn-on operation and turn-off operation of the switching elements Q1, Q2, Q3, Q4, Q5, Q6, Q7, and Q8 shown in FIG. 3 may also be executed by the controller 210.

Figure 4A:
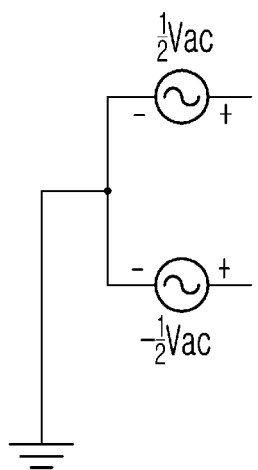
FIG. 4A-4C is a view illustrating various types of power sources embedded in the OBC according to an exemplary embodiment of the present disclosure.
Figure 4B:
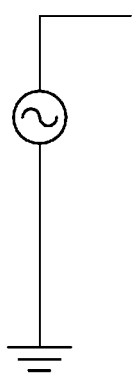
Figure 4C:
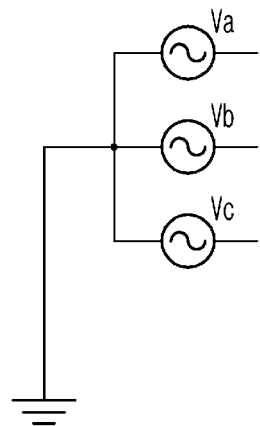

FIGS. 4A-4C are views illustrating various types of power sources embedded in the OBC according to a PFC link capacitor embodiment of the present disclosure. FIG. 4A is a view illustrating a bi-phase symmetric power source. Referring to FIG. 4A, the bi-phase symmetric power source may allow a power-supply voltage to be divided into two voltages ½ Vac and −½ Vac. Since the two voltages ½ Vac and −½ Vac may have opposite phases, the two voltages may be referred to as a bi-phase symmetric power source. The bi-phase symmetric power source shown in FIG. 4A is mainly used in North America.

FIG. 4B is a view illustrating a single-phase asymmetric power source. Referring to FIG. 4B, the single-phase asymmetric power source may provide a power-supply voltage formed in a single voltage (Vac) having a single phase. Since the single voltage (Vac) has a single phase, the single voltage (Vac) may be referred to as a single-phase asymmetric power source. The single-phase asymmetric power-supply shown in FIG. 4B is mainly used in Korea, North America, and Europe.

FIG. 4C is a view illustrating a three-phase symmetric power source. Referring to FIG. 4C, the three-phase asymmetric power source may allow a power-supply voltage to be divided into three voltages Va, Vb, and Vc. Since the three voltages Va, Vb, and Vc may have different phases, the three voltages may be referred to as a three-phase asymmetric power source. The three-phase asymmetric power source shown in FIG. 4C is mainly used in Europe.

The type of AC power source used vary based on country as described above, such that the OBC 202 according to the PFC link capacitor embodiment may be responsive to various types of AC power of individual counties through the on/off combinations of the switch network. For example, for the bi-phase symmetric power source, a boost power factor corrector formed in a single-phase full-bridge-inverter-type is implemented to charge the high-voltage battery 102 with power. For the single-phase asymmetric power source, a boost power factor corrector formed in a single-phase full-bridge-inverter-type is implemented along with a buck converter, or a boost plus boost structure is implemented to charge the high-voltage battery 102 with power. For the three-phase symmetric power source, a three-leg boost power factor corrector is implemented along with the buck converter to charge the high-voltage battery 102.

Figure 5:
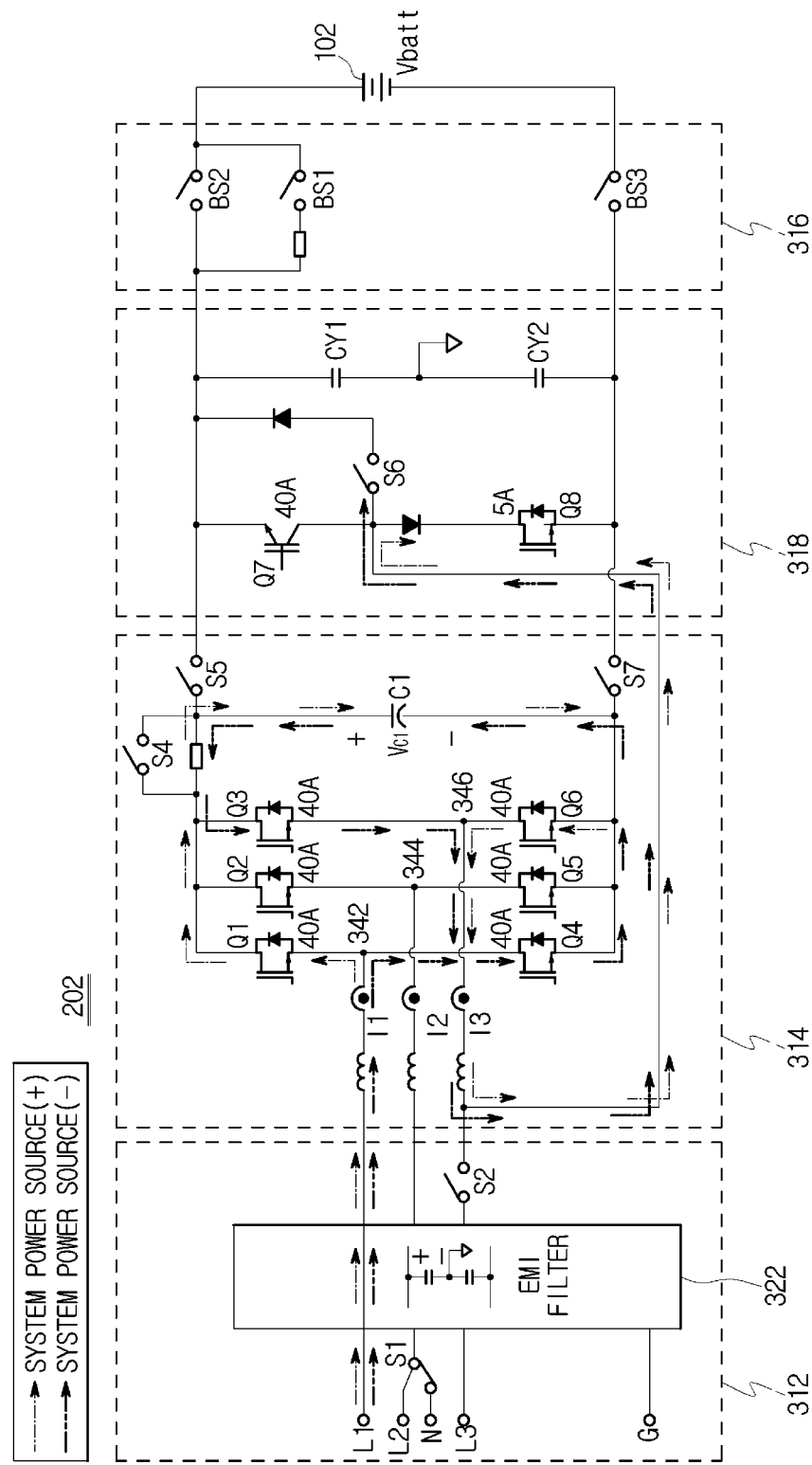
FIG. 5 is a view illustrating leakage current breaking of the OBC according to an exemplary embodiment of the present disclosure.

FIG. 5 is a view illustrating leakage current breaking of the OBC according to an exemplary embodiment of the present disclosure. The converter 318 described in FIG. 3 may break the leakage current and enable multi-stage boosting. As shown in FIG. 5, the AC input power received from the system power source may be classified into a positive (+) polarity denoted by a one-dot chain line arrow and a negative (−) polarity denoted by a two-dot chain line arrow. The power of the positive (+) polarity denoted by the one-dot chain line arrow may be disconnected by turning off the switching element Q8, and the power of the negative (−) polarity denoted by the two-dot chain line arrow may be disconnected by turning off the switching elements Q7 and Q8. As described above, the leakage current may break through the switching elements Q7 and Q8, and the switch S6 of the converter 318. Additionally, the multi-stage boosting may be increased through the switching elements Q7 and Q8.

Figure 6:
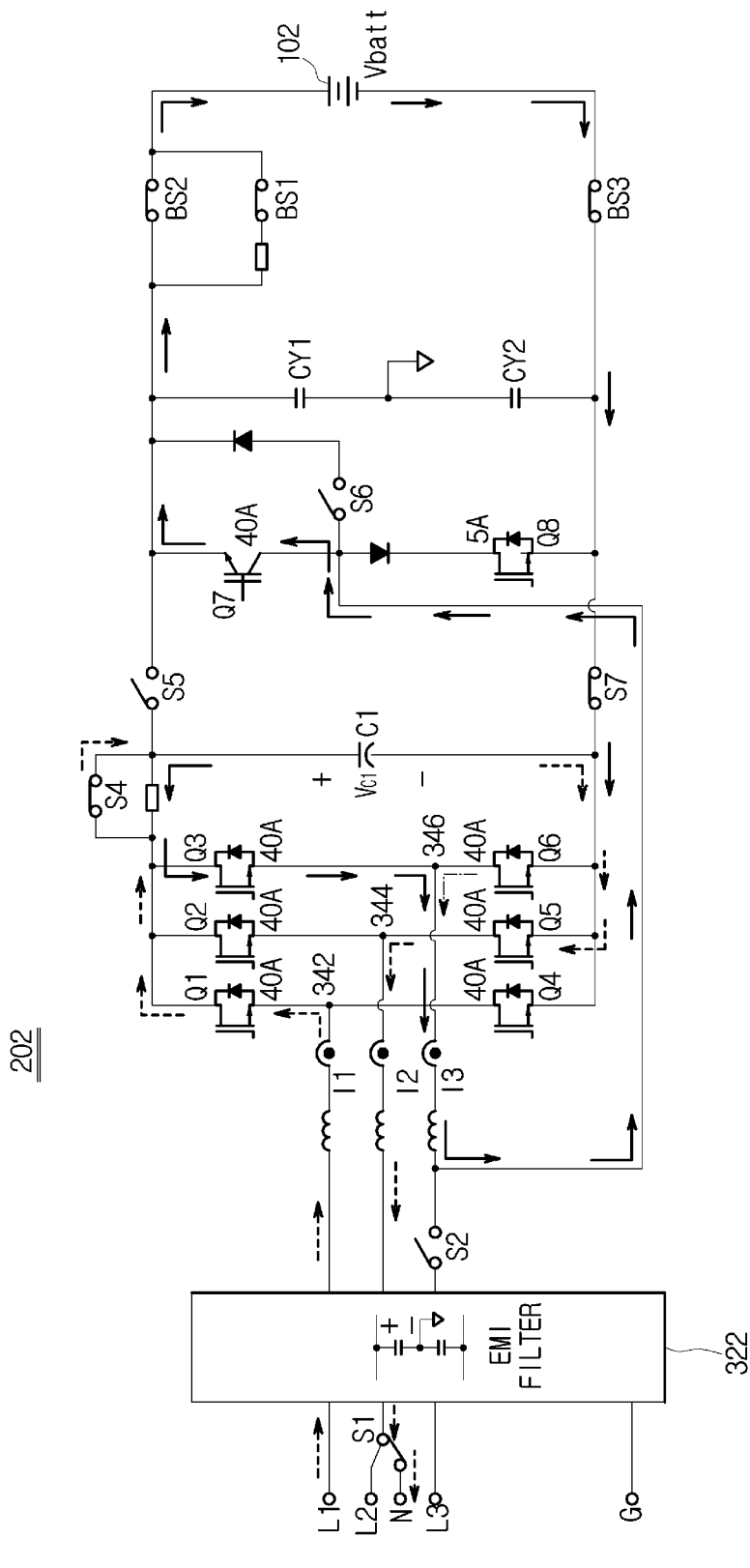
FIG. 6 is a view illustrating on/off combinations of a switch network coping with a 240V single-phase AC power source (EVSE) for use in North America, or a 220V single-phase AC power source for use in Europe and Korea according to an exemplary embodiment of the present disclosure.
Figure 7:
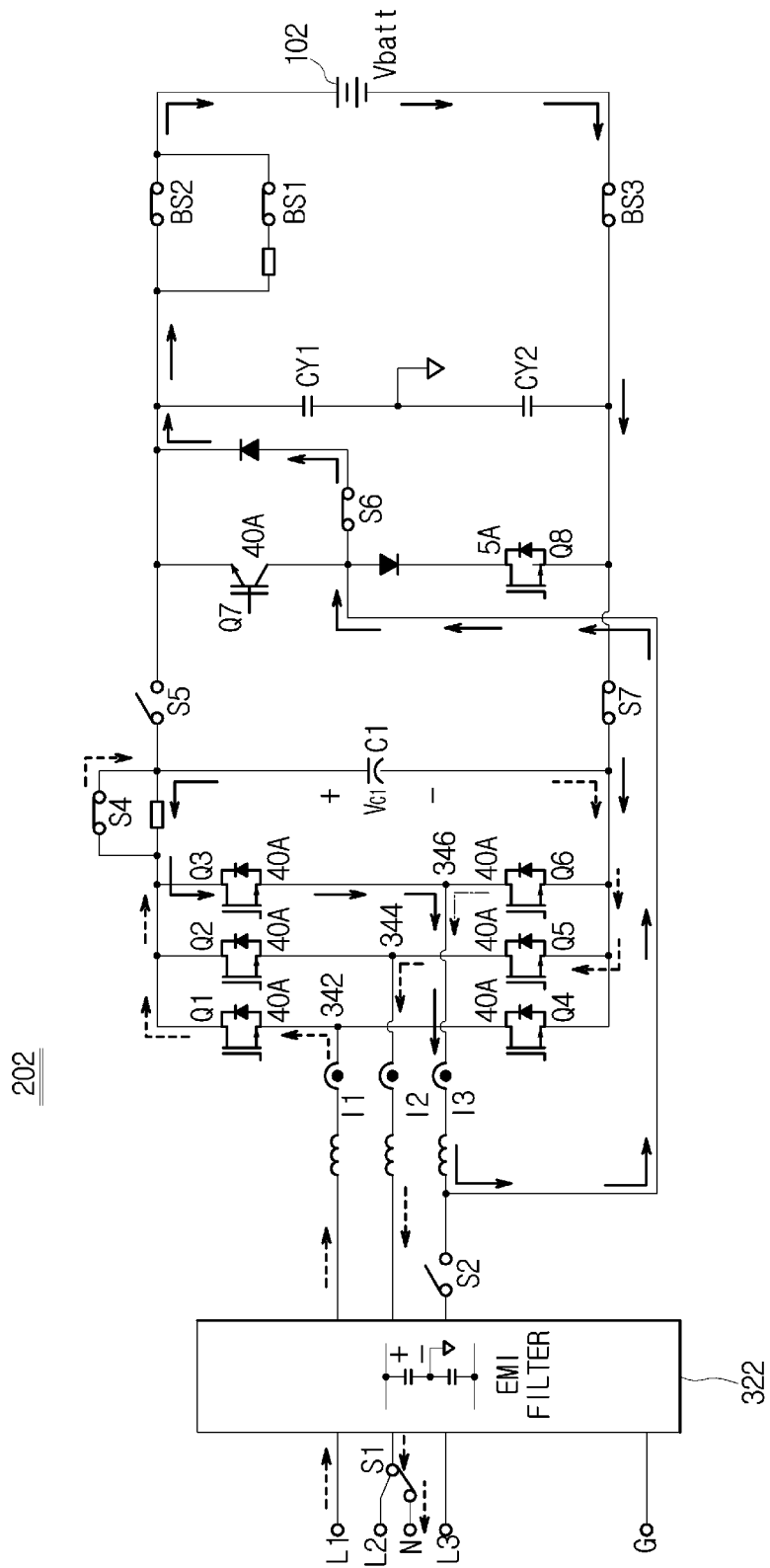
FIG. 7 is a view illustrating on/off combinations of a switch network coping with a 120V single-phase AC power source (ICCB) for use in Europe according to an exemplary embodiment of the present disclosure.
Figure 8:
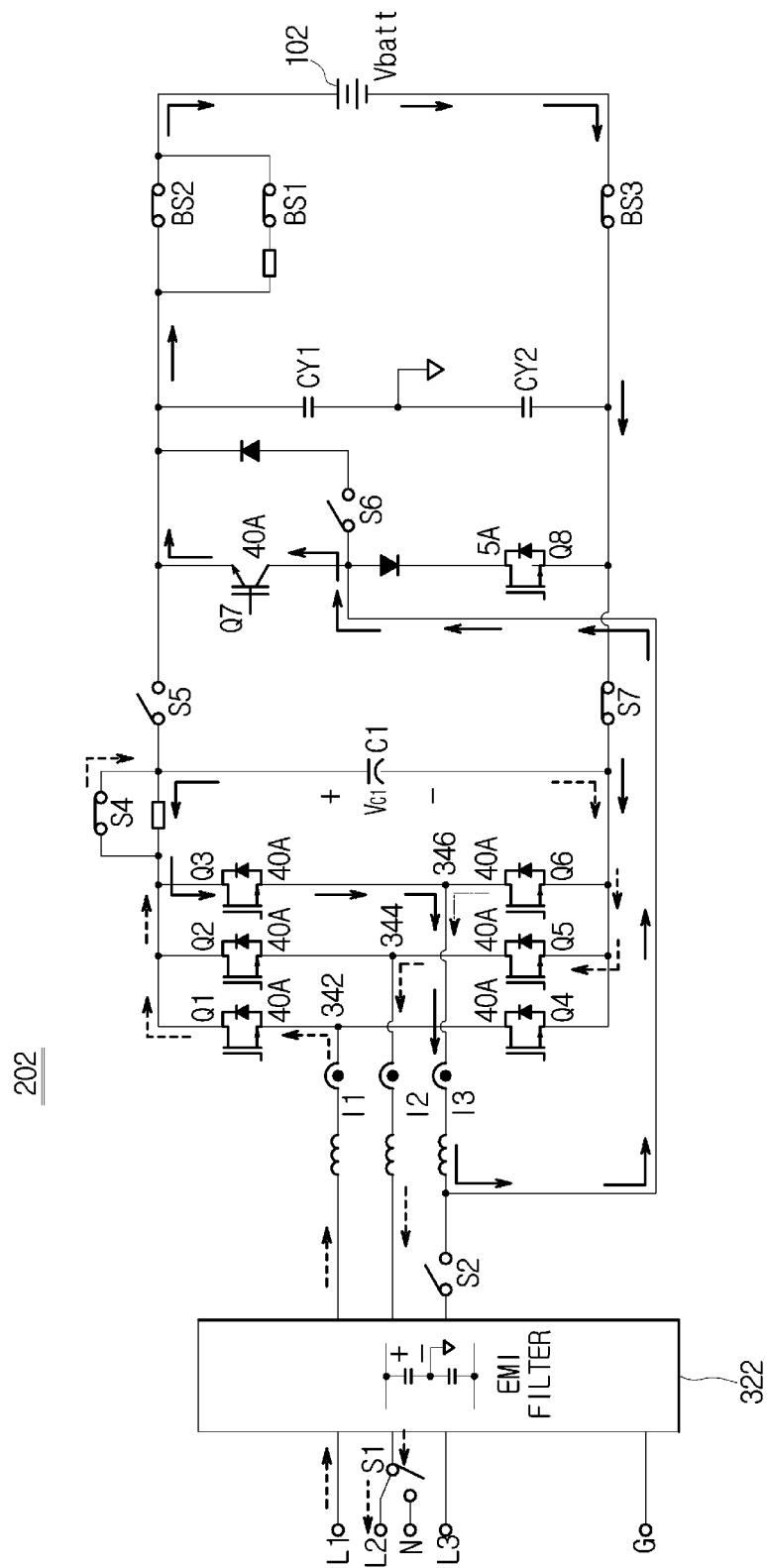
FIG. 8 is a view illustrating on/off combinations of a switch network coping with a 380V three-phase AC power source (ICCB) for use in Europe according to an exemplary embodiment of the present disclosure.

FIGS. 6 to 8 are views illustrating on/off combinations of a switch network coping with various types of AC power sources for use in various countries. FIG. 6 is a view illustrating on/off combinations of a switch network coping with a 240V single-phase AC power source (EVSE) for use in North America, or a 220V single-phase AC power source for use in Europe and Korea. In FIG. 6, the on/off combinations of the respective switches S1, S2, S4, S5, S6, S7, BS1, BS2, and BS3 for use in the switch network are as follows.

S1: ON, S2: OFF, S4: ON, S5: OFF, S6: OFF, S7: ON
BS1: ON, BS2: ON, BS3: ON

The switch S1 may be turned on and the neutral line N may be connected to the EMI filter 322, to allow single-phase symmetric AC power to be input to the electric vehicle through the AC power input line L1 and the neutral line N. All of the switches S2 and S6 may be turned on to connect the third leg 346 of the boost power factor corrector 314 to the node between the switching element Q7 and the switching element Q8. In addition, the switching elements Q1, Q3, and Q5 of the boost power factor corrector 314 may be turned on.

In FIG. 6, the single-phase full-bridge-inverter-type boost power factor corrector may be implemented when the switch S5 is turned on and the switch S6 is turned off. Conversely, when the switch S5 is turned off and the switch S6 is turned on, only the single-phase full-bridge-inverter-type boost power factor corrector may be implemented. By the above-mentioned on/off combinations of the switch network, the capacitor C1 may be charged along a path denoted by a dotted arrow in FIG. 6. A charge voltage of the capacitor C1 may charge the high-voltage battery 102 through the boost power factor corrector 314 and the converter 318 along a path denoted by a solid arrow in FIG. 6. By the above-mentioned on/off combinations of the switch network, the implementation result may be responsive to the 240V single-phase AC power source (EVSE) used in North America, or the 220V single-phase AC power source used in Europe and Korea.

FIG. 7 is a view illustrating on/off combinations of a switch network coping with a 120V single-phase AC power source (ICCB) for use in Europe. The ICCB is a household charger (e.g., in-vehicle control box) for charging electric vehicles. In FIG. 7, the on/off combinations of the respective switches S1, S2, S4, S5, S6, S7, BS1, BS2, and BS3 for use in the switch network are as follows.

S1: ON, S2: OFF, S4: ON, S5: OFF, S6: ON, S7: ON
BS1: ON, BS2: ON, BS3: ON

The switch S1 may be turned on and the neutral line N may be connected to the EMI filter 322, to allow single-phase symmetric AC power to be input to the electric vehicle through the AC power input line L1 and the neutral line N. The switch S2 may be turned off and the switch S6 may be turned on. As a result, the third leg 346 of the boost power factor corrector 314 may be connected to the node between the switching element Q7 and the switching element Q8, and may be connected to the positive (+) electrode of the high-voltage battery 102 through the switch S6. In addition, the switching elements Q1, Q3, and Q5 of the boost power factor corrector 314 may be turned on.

In FIG. 7, the single-phase full-bridge-inverter-type type boost power factor corrector and a half bridge buck converter may be implemented when the switch S5 is turned on and the switch S6 is turned off. Conversely, when the switches S5 and S6 are all turned off, only the single-phase full-bridge-inverter-type boost power factor corrector may be implemented. By the above-mentioned on/off combinations of the switch network, the capacitor C1 may be charged along a path denoted by a dotted arrow in FIG. 7. A charge voltage of the capacitor C1 may charge the high-voltage battery 102 through the boost power factor corrector 314 and the converter 318 along a path denoted by a solid arrow in FIG. 7. Since the single-phase full-bridge-inverter-type boost power factor corrector and the half bridge buck converter mode are implemented by the above-mentioned on/off combinations of the switch network, the implementation result may be responsive to the 120V single-phase AC power source (ICCB) used in Europe.

FIG. 8 is a view illustrating on/off combinations of a switch network coping with a 380V three-phase AC power source (ICCB) for use in Europe. In FIG. 8, the on/off combinations of the respective switches S1, S2, S4, S5, S6, S7, BS1, BS2, and BS3 for use in the switch network are as follows.

S1: OFF, S2: OFF, S4: ON, S5: OFF, S6: OFF, S7: ON
BS1: ON, BS2: ON, BS3: ON

The switch S1 may be turned off and AC power input line L2 may be connected to the EMI filter 322, to allow the three-phase AC power to be input to the electric vehicle through the AC power input lines L1 and L2, and the neutral line N. All of the switches S2 and S6 may be turned off. As a result, the third leg 346 of the boost power factor corrector 314 may be connected to the node between the switching element Q7 and the switching element Q8. In addition, the switching elements Q1, Q3, and Q5 of the boost power factor corrector 314 may be turned on.

In FIG. 8, a bi-phase boost power factor corrector and the half bridge buck converter may be implemented when the switch S2 is turned on. When the switch S2 is turned off, the bi-phase boost power factor corrector and the three-leg boost power factor corrector may be implemented. By the above-mentioned on/off combinations of the switch network, the capacitor C1 may be charged along a path denoted by a dotted arrow in FIG. 8. A charge voltage of the capacitor C1 may charge the high-voltage battery 102 through the boost power factor corrector 314 and the converter 318 along a path denoted by a solid arrow in FIG. 8. Since the single-phase full-bridge-inverter-type boost power factor corrector and the half bridge buck converter mode are implemented by the above-mentioned on/off combinations of the switch network, the implementation result may be responsive to the 380V three-phase AC power source used in Europe. In the charging apparatus of FIG. 8, when the switch S5 is turned on, it may operate as a three-phase boost circuit.

Figure 9:
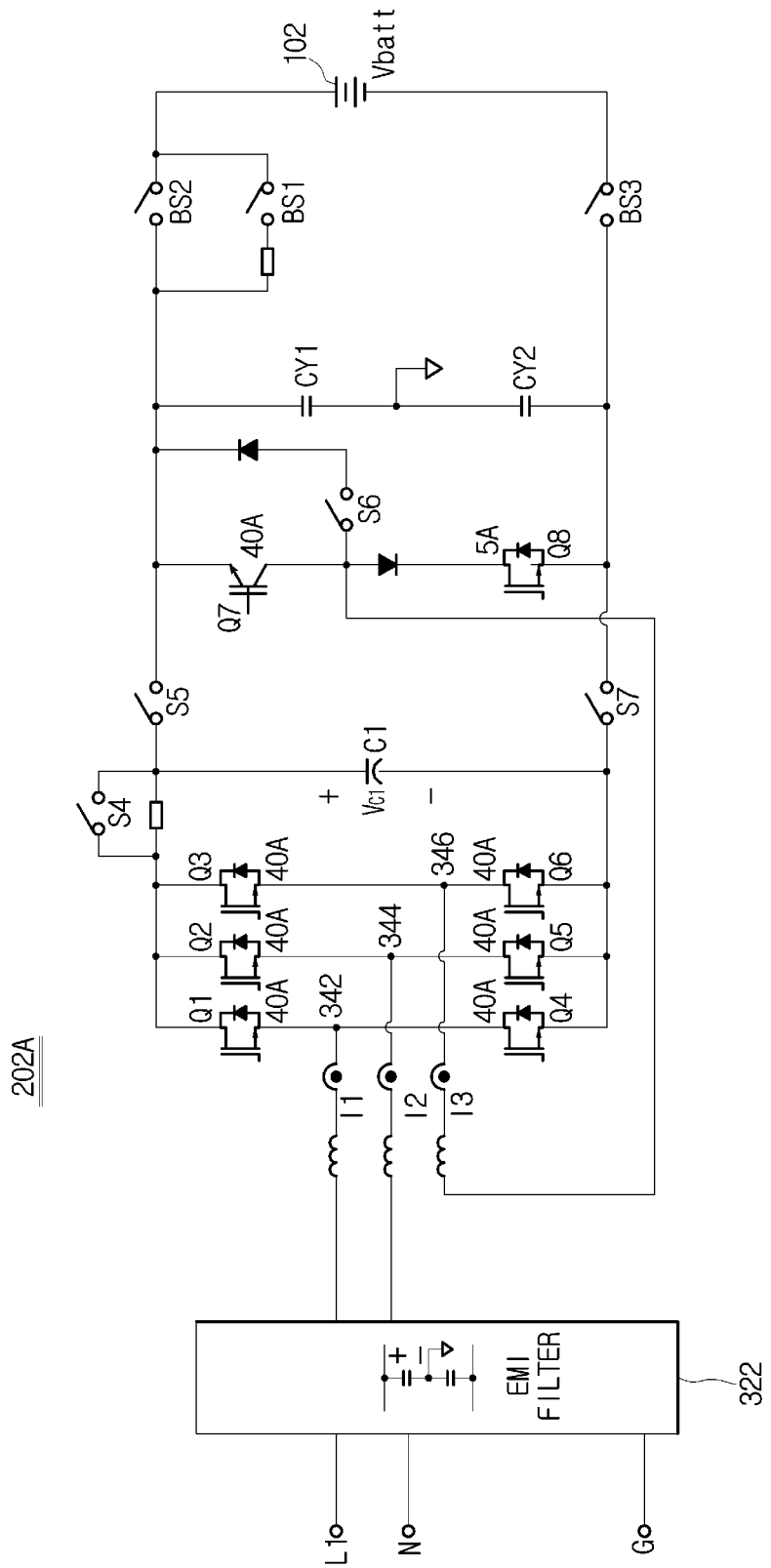
FIG. 9 is a view illustrating a first modified embodiment of the OBC according to an exemplary embodiment of the present disclosure.

FIG. 9 is a view illustrating a first modified embodiment of the OBC according to an exemplary embodiment of the present disclosure. An OBC 202A of the first modified embodiment shown in FIG. 9 is dedicated to a single-phase AC power source. The OBC 202A may include one single-phase AC power input line L1, the neutral line N and the ground G, and may omit the switch S2 of FIG. 3. Thus, only the single-phase AC power may be input through the AC power input line L1, the neutral line N, and the ground G. In particular, the switch S2 in FIG. 3 may be omitted. When the slow-speed charger 150 supplies only the single-phase AC power, the structure may be implemented more compactly and may be simplified by configuring the OBC 202A as shown in FIG. 9.

Figure 10:
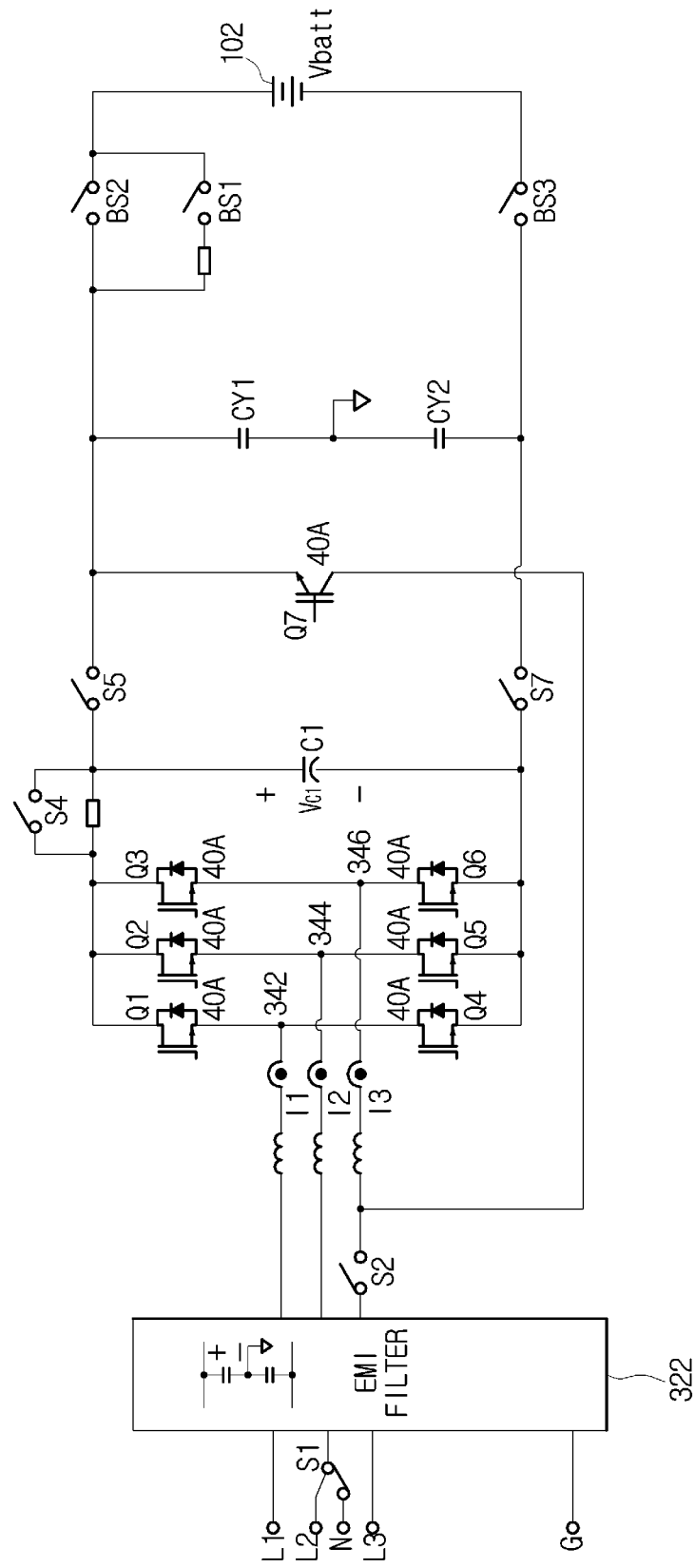
FIG. 10 is a view illustrating a second modified embodiment of the OBC according to an exemplary embodiment of the present disclosure.

FIG. 10 is a view illustrating a second modified embodiment of the OBC according to an exemplary embodiment of the present disclosure. An OBC 202B of the second modified embodiment shown in FIG. 10 has a structure for coping with the three-phase AC power supply, and has a structure that may be applied particularly when multi-stage boosting is unnecessary. Accordingly, the OBC 202B of FIG. 10 may omit the switching element Q8 of FIG. 3. In other words, among the switching elements Q7 and Q8, only the switching element Q7 may be connected between an end of the capacitor C2 and the third leg 346. When only the three-phase AC power is supplied to the slow-speed charger 150 and particularly, the multi-stage boosting is not required, the structure may be implemented more compactly and more simplified by configuring the OBC 202B as shown in FIG. 10.

As is apparent from the above description, the charging apparatus for the electric vehicle according to the exemplary embodiments of the present disclosure has a reduced-sized simplified structure, and charges the battery of the electric vehicle upon receiving various types of power sources.

It is to be understood that the above description is only illustrative of technical ideas, and various modifications, alterations, and substitutions are possible without departing from the essential characteristics of the present disclosure. Therefore, the exemplary embodiments and the accompanying drawings described above are intended to illustrate and not limit the technical idea, and the scope of technical thought is not limited by these embodiments and accompanying drawings. The scope of which is to be construed in accordance with the following claims, and all technical ideas which are within the scope of the same should be interpreted as being included in the scope of the right.

What is claimed is:

1. A charging apparatus for an electric vehicle, the charging apparatus comprising:
    an alternating current (AC) power input stage configured to receive at least one AC input power from among a single-phase AC power and a multi-phase AC power;
    a power factor corrector having a single three-leg half bridge circuit configured to receive the at least one AC input power through the AC power input stage;
    a link capacitor to be charged through the power factor corrector;
    a converter configured to connect between the link capacitor and a battery;
    a switch network having a first switch for connecting any one of an AC power input line and a neutral line of the AC power input stage to the power factor corrector, and at least one second switch for selectively connecting the AC power input stage to the power factor corrector, or the link capacitor; and
    a controller configured to operate the power factor corrector and the switch network based on a condition of the at least one AC input power received through the AC power input stage.

2. The charging apparatus according to claim 1, wherein the first switch is provided to the AC power input stage, and is turned on or off to respond to a multi-phase condition or a single-phase condition of the at least one AC input power.

3. The charging apparatus according to claim 2, wherein the at least one second switch further includes:
    a third switch disposed between the AC power input stage and the power factor corrector.

4. The charging apparatus according to claim 3, wherein the switch network further includes:
    a fourth switch disposed between the power factor corrector and the link capacitor.

5. The charging apparatus according to claim 4, wherein the switch network further includes:
    a fifth switch and a sixth switch respectively disposed between both ends of the link capacitor and between both ends of the converter.

6. The charging apparatus according to claim 5, wherein the converter further includes:
    two switching elements connected in series, wherein a connection point of the two switching elements is connected to at least one leg of the power factor corrector; and
    a seventh switch disposed between the connection point and an end of the battery.

7. The charging apparatus according to claim 1, wherein the controller is configured to convert the power factor corrector into a plurality of different types of converters through operation of the power factor corrector, the switch network, and an inverter, and configured to respond to the condition of the at least one AC input power.

8. The charging apparatus according to claim 1, wherein the condition of the at least one AC input power includes a multi-phase condition and a single-phase condition of the at least one AC input power.

9. The charging apparatus according to claim 1, wherein the condition of the at least one AC input power includes a symmetric power condition and an asymmetric power condition of the at least one AC input power.

10. A charging apparatus for an electric vehicle, the charging apparatus comprising:
    an alternating current (AC) power input stage configured to receive at least one AC input power from among a single-phase AC power and a multi-phase AC power;
    a power factor corrector having a single three-leg half bridge circuit configured to receive the at least one AC input power through the AC power input stage;
    a link capacitor to be charged through the power factor corrector;
    a converter configured to connect between the link capacitor and a battery;
    a switch network having a first switch for connecting any one of an AC power input line and a neutral line of the AC power input stage to the power factor corrector, and at least one second switch for selectively connecting the AC power input stage to the power factor corrector, or the link capacitor; and
    a controller configured to operate the power factor corrector and the switch network based on a condition of the at least one AC input power received through the AC power input stage,
    wherein the switch network further includes:
    the first switch provided to the AC power input stage and is turned on or off to respond to a multi-phase condition or a single-phase condition of the at least one AC input power; and
    the second switch disposed between the AC power input stage and the power factor corrector.

11. The charging apparatus according to claim 10, wherein the switch network further includes:
    a fourth switch disposed between the power factor corrector and the link capacitor.

12. The charging apparatus according to claim 11, wherein the switch network further includes:
    a fifth switch and a sixth switch respectively disposed between both ends of the link capacitor and between both ends of the converter.

13. The charging apparatus according to claim 12, wherein the converter further includes:
    two switching elements connected in series, wherein a connection point of the two switching elements is connected to at least one leg of the power factor corrector; and
    a seventh switch disposed between the connection point and an end of the battery.

14. The charging apparatus according to claim 10, wherein the controller is configured to convert the power factor corrector into a plurality of different types of converters through operation of the power factor corrector, the switch network, and an inverter, and configured to respond to the condition of the at least one AC input power.

15. The charging apparatus according to claim 10, wherein the condition of the at least one AC input power includes a multi-phase condition and a single-phase condition of the at least one AC input power.

16. The charging apparatus according to claim 10, wherein the condition of the at least one AC input power includes a symmetric power condition and an asymmetric power condition of the at least one AC input power.

17. A charging apparatus for an electric vehicle, the charging apparatus comprising:
- an alternating current (AC) power input stage configured to receive at least one AC input power from among a single-phase AC power and a multi-phase AC power;
- a power factor corrector having a single three-leg half bridge circuit configured to receive the at least one AC input power through the AC power input stage;
- a link capacitor to be charged through the power factor corrector;
- a converter configured to connect between the link capacitor and a battery, and including two switching elements connected in series, wherein a connection point of the two switching elements is connected to at least one leg of the power factor corrector, and a seventh switch disposed between the connection point and an end of the battery;
- a switch network having a first switch for connecting any one of an AC power input line and a neutral line of the AC power input stage to the power factor corrector, and at least one second switch for selectively connecting the AC power input stage to the power factor corrector, or the link capacitor; and
- a controller configured to operate the power factor corrector and the switch network based on a condition of the at least one AC input power received through the AC power input stage.

* * * * *